Feb. 17, 1970     W. HEIMES     3,495,454
DEVICE FOR ELECTRICALLY MEASURING THE TENSION OF MOVING THREADS
Filed Jan. 23, 1967     4 Sheets-Sheet 1

Feb. 17, 1970 W. HEIMES 3,495,454
DEVICE FOR ELECTRICALLY MEASURING THE TENSION OF
MOVING THREADS
Filed Jan. 23, 1967 4 Sheets-Sheet 2

Feb. 17, 1970  W. HEIMES  3,495,454
DEVICE FOR ELECTRICALLY MEASURING THE TENSION OF
MOVING THREADS
Filed Jan. 23, 1967  4 Sheets-Sheet 3

Feb. 17, 1970     W. HEIMES     3,495,454
DEVICE FOR ELECTRICALLY MEASURING THE TENSION OF MOVING THREADS
Filed Jan. 23, 1967     4 Sheets-Sheet 4

United States Patent Office
3,495,454
Patented Feb. 17, 1970

3,495,454
DEVICE FOR ELECTRICALLY MEASURING THE TENSION OF MOVING THREADS
Willy Heimes, Krefeld, Germany, assignor to Palitex Project-Company G.m.b.H., Krefeld, Germany
Filed Jan. 23, 1967, Ser. No. 611,053
Claims priority, application Germany, Jan. 24, 1966, P 38,608
Int. Cl. G01l 5/04
U.S. Cl. 73—144     8 Claims

ABSTRACT OF THE DISCLOSURE

The present invention relates to electrically measuring the tension of moving threads in textile machines. The thread, the tension of which is to be measured, is passed over guiding pin means and feeler pin means, causing the feeler pin means to move under the influence of the thread tension. A magnetic field producing means is positioned at one end portion of the feeler pin means, and the feeler pin means effects relative displacement of the magnetic field producing means and associate plate means. The relative displacement, changes the intensity of magnetic flux passing through the plate means in conformity with the change in the tension of the thread and the change in the magnetic flux is recorded.

---

The present invention relates to a device for electrically determining the measuring of the tension of moving threads in textile machines. In connection with the measuring of tension of such threads, it is known to pass the threads over levers and to carry out the measuring operation over a relatively long spring stroke. This type of measuring of the tension of threads is impractical, and it is known instead thereof to employ the so-called strokeless, measuring operation for the thread tension determination. According to this last mentioned method, the thread is passed between two guiding pins on a feeler pin. The feeler pin is displaced or diverted by the thread tension. At the other end of this lever which generally is mounted on a tension spring, there is provided a condenser. The end of the lever extends into the space between the condenser plates, and, by means of the deflection or displacement of the lever, the condenser or the circuit in which the condenser is connected varies as to resonant condition thereof.

This arrangement requires a complicated circuit and also requires feeding from an electric network. The device for measuring the thread tension becomes in this way rather space consuming and impractical in operation.

It is an object of the present invention to provide a device for electrically measuring the tension of a moving thread in textile machines while employing a feeler pin mounted on a tension spring and adapted to be deflected or displaced, which device will be easy to operate and requires only a simple circuit.

It is another object of this invention to provide a device as set forth in the preceding paragraph, which will have a minimum of parts.

These and other objects and advantages of the invention will appear more clearly from the following specification in connection with the accompanying drawings, in which.

FIGS. 9 to 12 respectively illustrate different housings for use in connection with the present invention.

The measuring device according to the present invention is characterized primarily in that the rear end of the feeler pin carries at least one field plate within the flux path range or scope of a magnet, preferably of a permanent magnet, and brings about the displacement or deflection of the plate in the magnetic field for effecting a different flux therethrough. It is a well known fact that field plates are semi-conductors which change their resistance in conformity with the intensity of the magnetic flux therethrough. Therefore, when the field plate at the end of the feeler pin is moved in the magnetic field, a change in the flux therethrough is obtained in conformity with the extent of the displacement or deflection. This extent is in its turn a measure for the mechanical tension or change in the tension of the thread. The field plate forms a variable resistor in a Wheatstone bridge which in turn is energized by a direct current source, preferably a battery. If desired, also carrelary inverse design is feasible for the device, in which for instance, the premanent magnet is connected to the end of the feeler pin and moves within the range of at least one field plate.

It is also possible to install the field plate in the form of a variable resistor in a transistorized direct current amplifying circuit. The construction of the device may furthermore be varied by employing a Hall generator instead of a field plate. A Hall generator is a semi-conductor equipped device which produces voltage in conformity with the magnetic field when the plate is acted upon by a control current. Such an arrangement brings about the same favorable results as the employment of a field plate but requires a more expensive circuit.

The indication, however, is to a certain extent subjected less to inertia. In practice, the employment of field plates is preferable because no additional current requirement is encounterd.

Figure 1:
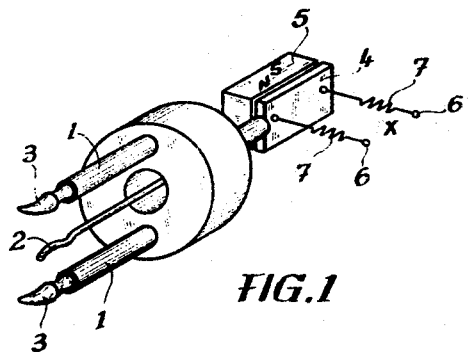
FIG. 1 illustrates a device according to the present invention and in particular the measuring head comprising two guiding pins and a feeler pin.

Referring now to the drawings, the various figures illustrate preferred embodiments of the invention and show a perspective view of the measuring head with the plates and with the magnets and in addition thereto also show the circuits. The drawings furthermore illustrate in perspective the outer shape of the device for practical use. More specifically, referring to FIG. 1, the end of the feeler pin 2 has mounted thereon a field plate 4 of rectangular shape. This plate 4 is arranged in the direct relation or immediate vicinity of a block-shaped permanent magnet 5 having its poles located on its major surfaces. The field plate 4, which may consist for instance of indium-antimonide, has its electrical terminals at 6 for connection to a Wheatstone bridge or a transistorized direct current amplifying circuit. Inasmuch as plate 4 is moved under the influence of the feeler pin 2, flexible sections 7 are interposed in wiring conductors 6.

Figure 2:
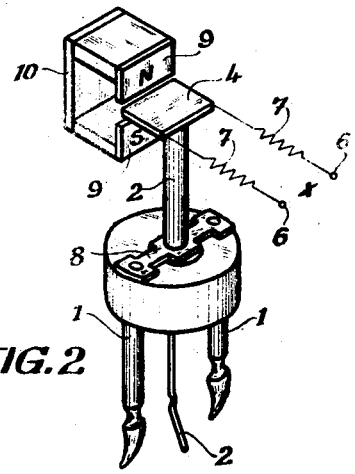
FIG. 2 shows the mouting of the feeler pin on a torsion spring.

FIG. 2 shows the mounting of the feeler pin 2 on a torsion spring 8. At the end of the feeler pin 2 there is provided a field plate 4 which is moved into the air gap between two pole plates 9 of a permanent magnet 10 when a movement is imparted upon plate 4 by the feeler pin 2.

Figures 3, 5:
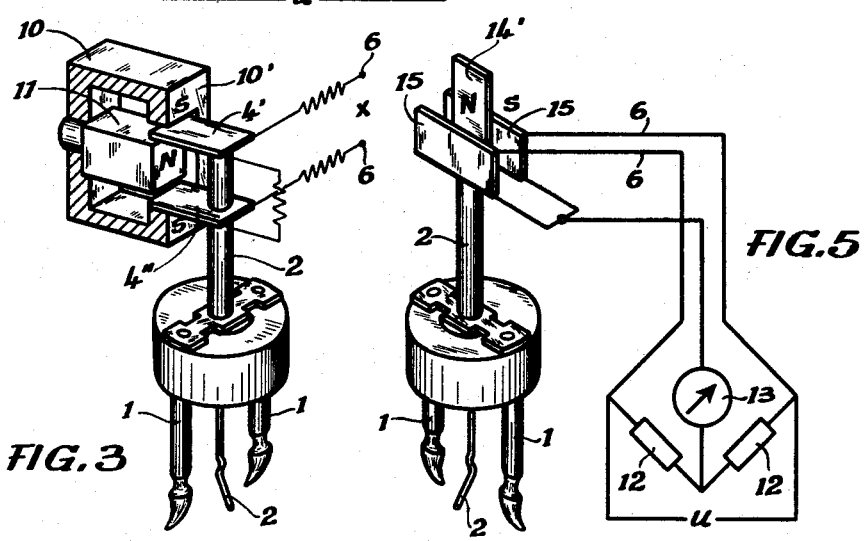
FIG. 3 is a diagrammatic representation of a modified measuring device according to the present invention.
FIG. 5 shows a device according to the present invention in which one end of the feeler pin is provided with a permanent magnet.

A modified arrangement is shown in FIG. 3 according to which two field plates 4′ and 4″ are mounted on the feeler pin 2 and extend into the air gap of a pot-shaped magnet. This magnet is formed by a soft iron pot 10, the bottom of which has inserted therein a permanent magnet 11 which extends into a corresponding recess of lid 10′ for forming a gap.

Figure 4:
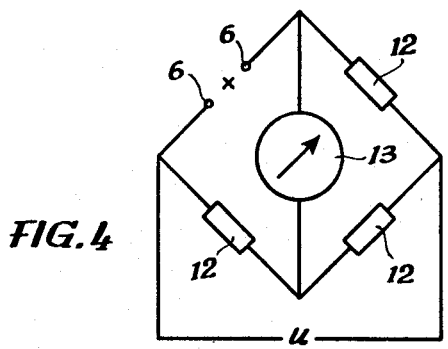
FIG. 4 shows a Wheatstone bridge for use in connection with the present invention.

When the moving thread of a textile machine, for instance of a thread twisting machine, extends over the horns 3 passes between the guiding pin 1 and the feeler pin 2, the feeler pin is moved by the mechanical tension of the thread so that the field plate 4 or the two field plates 4′ and 4″ will be moved. They will change their position relative to the permanent magnet or to the permanent magnetic field. As a result thereof, the electric flux resistance or magnetoresistive effect of field plate 4 is changed. As will be evident from FIG. 4, this plate is interposed in a Wheatstone bridge in which it represents the variable resistor.

At 12 there are indicated the fixed resistors, and 13 represents the indicating instrument, for instance a galvanometer. The Wheatstone bridge is fed from the direct current source which may advantageously be a battery.

Figure 6:
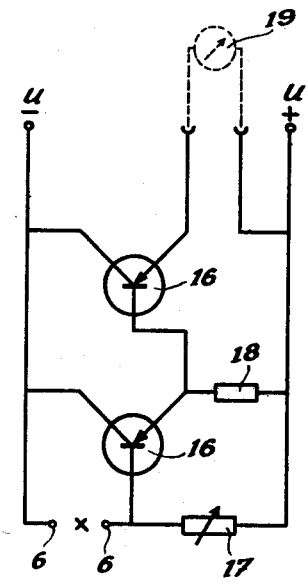
FIG. 6 illustrates a transistorized direct current amplifying circuit.

Referring now to FIG. 5, the arrangement shown therein has a permanent magnet 14 mounted at the end of pin 2, said magnet being movable between two field plates 15. Also in this instance, the field plates 15 are connected to a Wheatstone bridge. The two plates 15 in effect form two variable resistors which are arranged in opposite sense or relationship so that a particularly sensitive indication will be obtained. If a Wheatstone bridge according to FIG. 4 or 5 should not be sufficiently sensitive or, if instead of an expensive sensitive galvanometer, a coarser instrument is to be utilized as desired, it is possible to employ therewith a transistorized direct current amplifying circuit as shown in FIG. 6. The field plates are connected to the circuit at 6 and the circuit is provided with transistors 16. Furthermore, a balancing resistor 17 and a fixed resistor 18 are provided. A change in the resistance in the field plates, which are connected at 6 in the circuit fed by a direct current source U, will produce a change in the current which is amplified by the transistors and can be read from the instrument 19.

Figure 7:
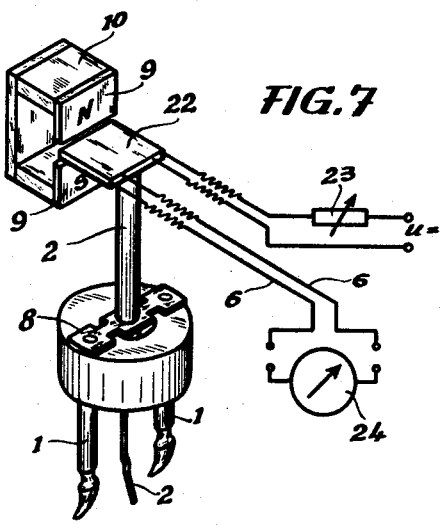
FIG. 7 shows a device which differs from the devices of FIGS. 1 to 6 primarily in that at one end of the feeler pin there is provided a Hall generator movable within the range of the pole plates of a permanent magnet.

FIG. 7 shows an arrangement fully corresponding to that of the embodiment shown in FIGS. 1 to 6 as to the mechanical parts thereof, but differs electrically from the preceding arrangements in that a Hall generator 22 is provided at the end of pin 2. This Hall generator is movable within the range of the pole plates 9 of a permanent magnet 10. The control current is fed to the generator 22 by a direct current source U through a control resistor 23. In view of the movement of the Hall generator 22 in the permanent magnet field of the magnet 10, a voltage is produced which can be read from the instrument 24. The deflection or displacement of this instrument is a measure for the mechanical tension of the moving thread.

Figure 8:
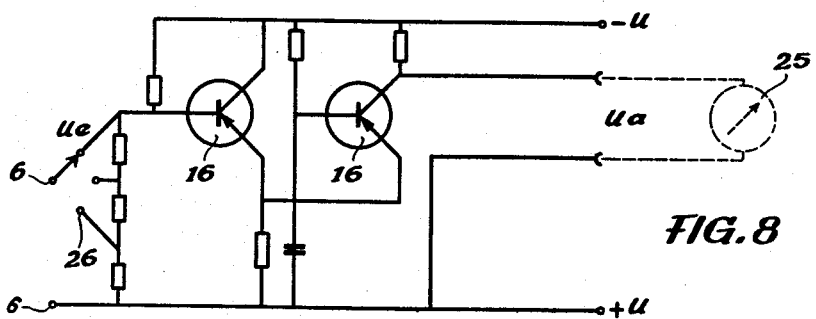
FIG. 8 shows a modified transistorized amplifying circuit which may be used in place of a part of the arrangement of FIG. 7.

The relatively sensitive instrument 24 may be replaced by a coarser instrument 25 when a transistorized amplifying circuit is employed as shown in FIG. 8. The connection is effected at 6 through a sensitivity range switch indicated at 26. The voltage is amplified by the transistor 16 and is conveyed to the indicating instrument 25. The transistorized amplifier is fed by the same current source U which furnishes control current to the Hall generator 22.

Regardless of the arrangement selected in the individual instance, it is practically always possible to operate with small batteries, and the circuit itself is relatively inexpensive so that the entire measuring instrument can be mounted in a housing of which the size is determined primarily by the respective or particular indicating instrument utilized. Various preferred embodiments for such housings are shown for instance in FIGS. 9 to 12.

Head 26 with the guiding pins 1 and feeler pin 2 is mounted on a box 27 (FIG. 9) which practically represents the indicating instrument 28. Box 27 is equipped with a handle 29 which makes it possible to place the device against the moving thread particularly for the purpose of carrying out a measuring operation. In order accordingly to facilitate the placing of the thread between the pins 1, 2, the pins 1 are arranged on a manually operable rocker or tipper lever 30 which is linked to the head 26 by pivot means 31. The pins may in this way be deflected or displaced in the direction of the arrow 32 in order to pass the device into the path of the thread.

Figure 9:
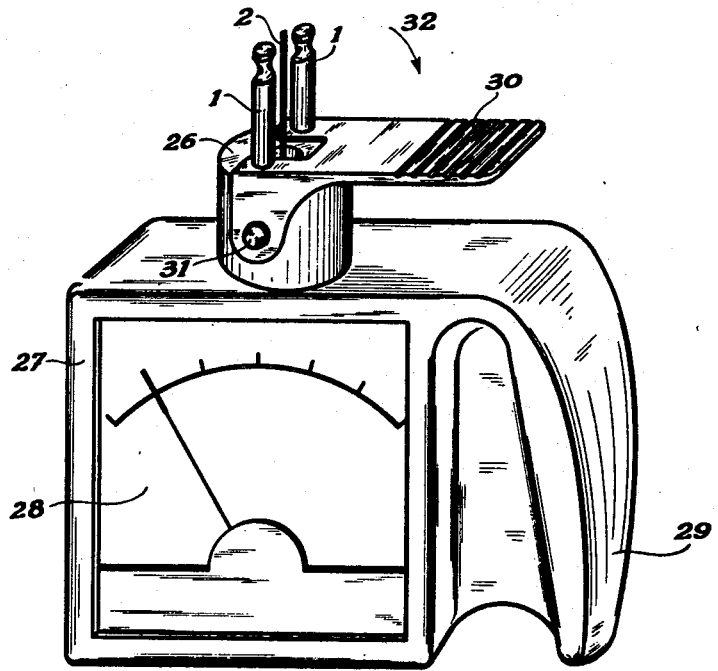
Figure 10:
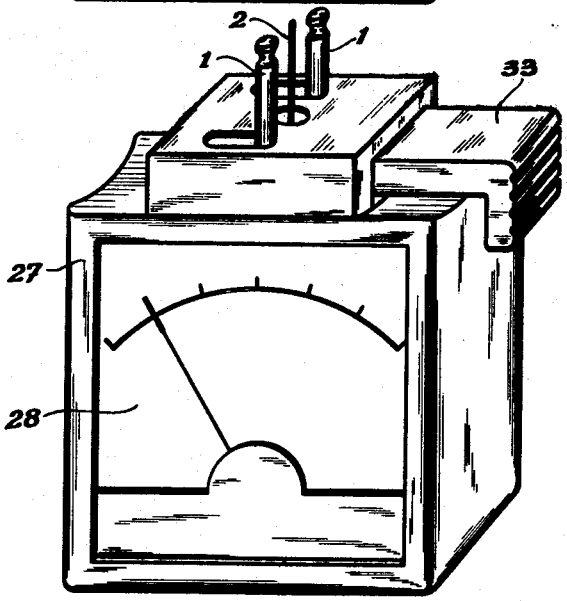

The embodiment of FIG. 10 differs from that of FIG. 9 primarily in that the pins 1 are arranged on a slide 33 which is operable manually against spring pressure.

Figure 11:
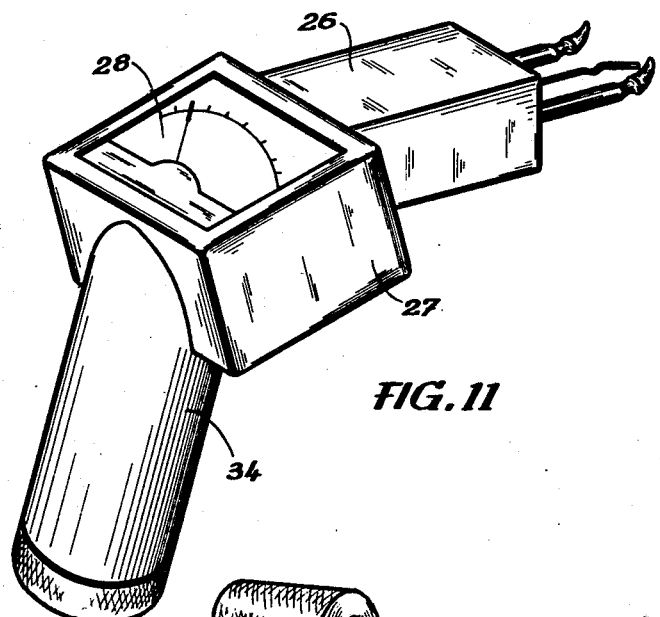

According to the embodiment of FIG. 11, head 26 is mounted on box 27 at an angle, and the cylindrical member 34 which is arranged at an angle is adapted to receive and house the battery. This device is in the shape of a pistol grip configuration and is particularly handy for the measuring of the mechanical tension of a moving thread.

Figure 12:
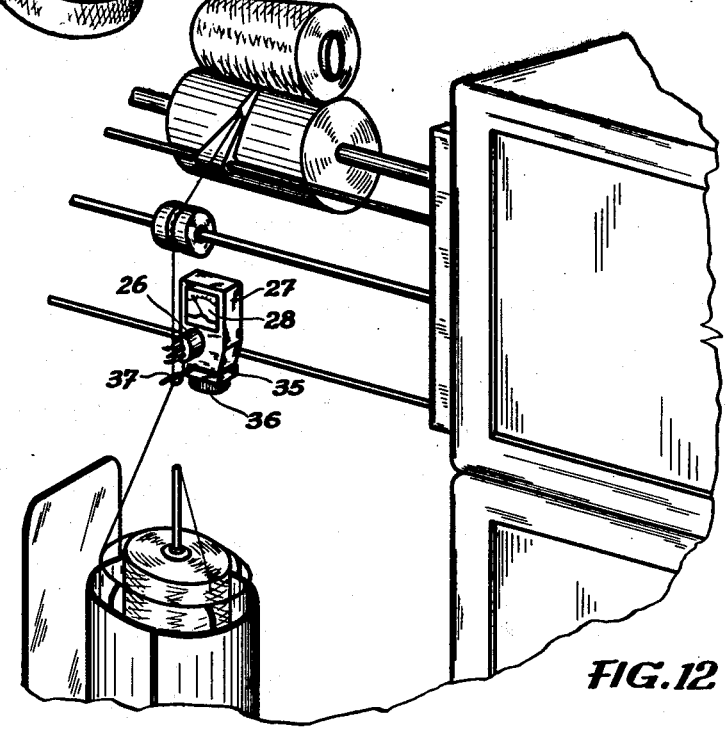

Finally, with regard to the shape shown in FIG. 12, it will be noted that the head 26 is mounted at the front on box 27 directly below the indicating instrument 28. Therebelow is provided a clamping slot 35 with a knurled screw 36. By means of this device, the instrument can for instance be firmly mounted in an upward thread twisting machine, to which end it is clamped on the pigtail thread guide 37 and together with the latter can be clamped into the assembled relationship with the machine.

It is, of course, to be understood that the present invention is, by no means, limited to the particular constructions and designs shown in the drawings but also comprises any modifications within the scope of the invention.

What I claim is:

1. An apparatus especially handy for electrically measuring the tension of moving threads in textile machines, which includes: a measuring head comprising torsion spring means, thread guiding pin means, and feeler pin means having a thread containing front end and mounted on said torsion spring means for feeling the tension of a thread passing over said thread guiding pin means, a first member in the form of magnetic field-producing means, a second member in the form of magnetoresistive plate means operable to vary its resistance in response to the intensity of magnetic flux passing therethrough, one of said members being fixed and the other of said members being carried by the rear end of said feeler pin means, whereby the distance between said first and second members and the magnetic flux through said plate means vary in conformity with the movement of the rear end of said feeler pin means as brought about by the movement of the thread contacting front end of said feeler pin means.

2. An apparatus according to claim 1, in which the rear end of said feeler pin means carries the plate means.

3. An apparatus according to claim 1, which includes a Wheatstone bridge means, and in which said plate means is interposed in said Wheatstone bridge means and effectively forms a variable resistor element in said Wheatstone bridge means.

4. An apparatus according to claim 1, which includes a transistorized direct current amplifier circuit insensitive to moisture and shock and in which said plate means is interposed in and forms a variable resistor element of said transistorized circuit.

5. An apparatus according to claim 1, in which the rear end of said feeler pin means carries said magnetic field producing means.

6. An apparatus according to claim 5, in which said magnetic field producing means is formed by a permanent magnet.

7. An apparatus according to claim 1, in which said thread guiding pin means are parallel pins adjustably mounted on said head and having horns at ends thereof in diametrically opposite locations spaced from said feeler pin means.

8. An apparatus especially handy for electrically measuring the tension of moving threads in textile machines, which includes: a measuring head comprising torsion spring means, thread guiding pin means, and feeler pin means having a thread contacting front end and mounted on said torsion spring means for feeling the tension of a thread passing over said thread guiding pin means, a first member in the form of magnetic field producing means, a second member in the form of a Hall generator operable to vary its voltage in response to the intensity of magnetic flux passing therethrough, one of said members being fixed and the other of said members carried by the rear end of said feeler pin means, whereby the distance between said first and second members and the magnetic flux through said plate means vary in conformity with the movement of the rear end of said feeler pin means as brought about by the movement of the thread contacting front end of said feeler pin means.

References Cited

UNITED STATES PATENTS

| | | | |
|---|---|---|---|
| 2,188,754 | 1/1940 | Keeler | 73—160 |
| 2,284,364 | 5/1942 | Breazeale | 73—144 |
| 2,712,601 | 7/1955 | Reinwald. | |
| 2,767,576 | 10/1956 | Seney | 73—144 |
| 2,809,520 | 10/1957 | Richard | 73—189 |
| 3,046,361 | 7/1962 | Wiehl. | |
| 3,187,254 | 6/1965 | Wasserman | 73—517 XR |

FOREIGN PATENTS 1,134,920  12/1956  France.

CHARLES A. RUEHL, Primary Examiner